(12) United States Patent
Asakura et al.

(10) Patent No.: US 7,698,717 B2
(45) Date of Patent: Apr. 13, 2010

(54) SYSTEM FOR RECORDING/REPRODUCING PHOTOSENSITIVE RECORDING MEDIUM

(75) Inventors: Katsuyoshi Asakura, Kanagawa (JP); Tomoyuki Takahashi, Kanagawa (JP); Osamu Matsuura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 723 days.

(21) Appl. No.: 11/505,410

(22) Filed: Aug. 17, 2006

(65) Prior Publication Data
US 2007/0044116 A1    Feb. 22, 2007

(30) Foreign Application Priority Data
Aug. 17, 2005   (JP)   ............................. P2005-236663

(51) Int. Cl.
G11B 23/03    (2006.01)
(52) U.S. Cl. ................. 720/725; 720/738; 720/740
(58) Field of Classification Search ............... 720/725, 720/726, 738, 740, 744; 360/133; 369/103
See application file for complete search history.

(56) References Cited

U.S. PATENT DOCUMENTS

| | | | |
|---|---|---|---|
| 5,406,547 A * | 4/1995 | Akiyama et al. ............ | 720/740 |
| 6,772,430 B2 * | 8/2004 | Oishi et al. ................. | 720/729 |
| 2002/0196730 A1 * | 12/2002 | Kang et al. ................. | 369/291 |
| 2003/0198177 A1 | 10/2003 | Horimai et al. | |
| 2005/0028180 A1 * | 2/2005 | Hertrich ..................... | 720/633 |
| 2005/0028186 A1 * | 2/2005 | Hertrich ..................... | 720/738 |
| 2008/0172687 A1 | 7/2008 | Sugita et al. | |

FOREIGN PATENT DOCUMENTS

| | | |
|---|---|---|
| JP | 2001-250228 A | 9/2001 |
| JP | 2003-317422 A | 11/2003 |
| JP | 2004-29476 A | 1/2004 |
| WO | 2005-038607 A2 | 4/2005 |
| WO | 2006/093025 A1 | 9/2006 |

OTHER PUBLICATIONS

Notification of Reasons for Refusal issued in counterpart Japanese Application No. 2005-236663 dated Feb. 9, 2010, English translation.

* cited by examiner

*Primary Examiner*—Andrea L Wellington
*Assistant Examiner*—Gustavo Polo
(74) *Attorney, Agent, or Firm*—Sughrue Mion, PLLC

(57) ABSTRACT

A system for recording/reproducing a photosensitive recording medium, comprising: a photosensitive recording medium cartridge including a cartridge body, a shutter, and a lock mechanism as defined herein; and a recording/reproducing device including a housing, an insertion port shutter, an unlock mechanism, and a shutter opening mechanism as defined herein.

12 Claims, 13 Drawing Sheets

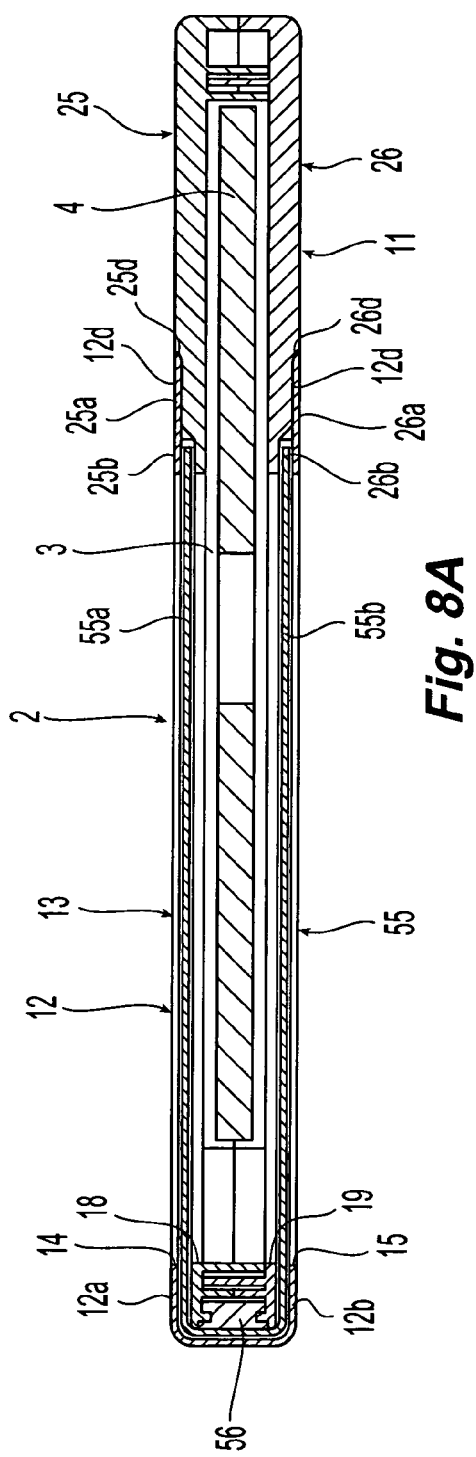
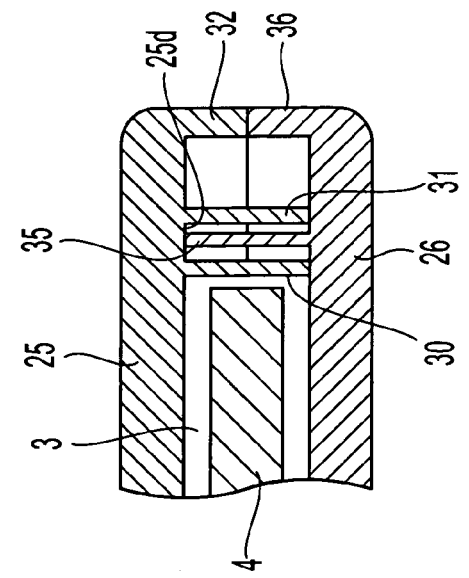
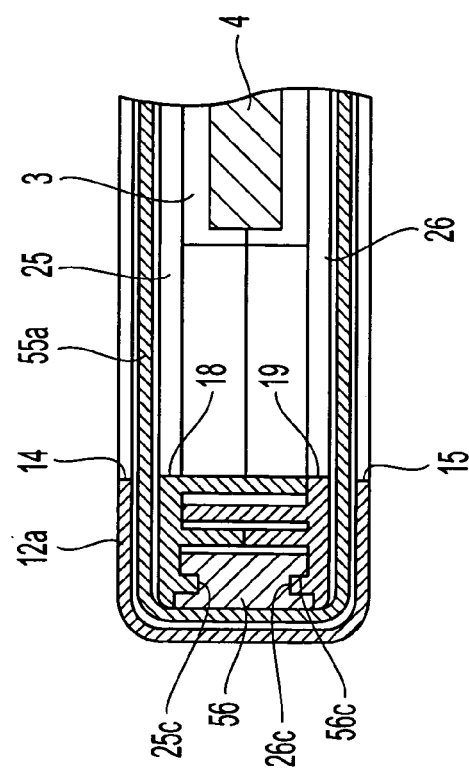

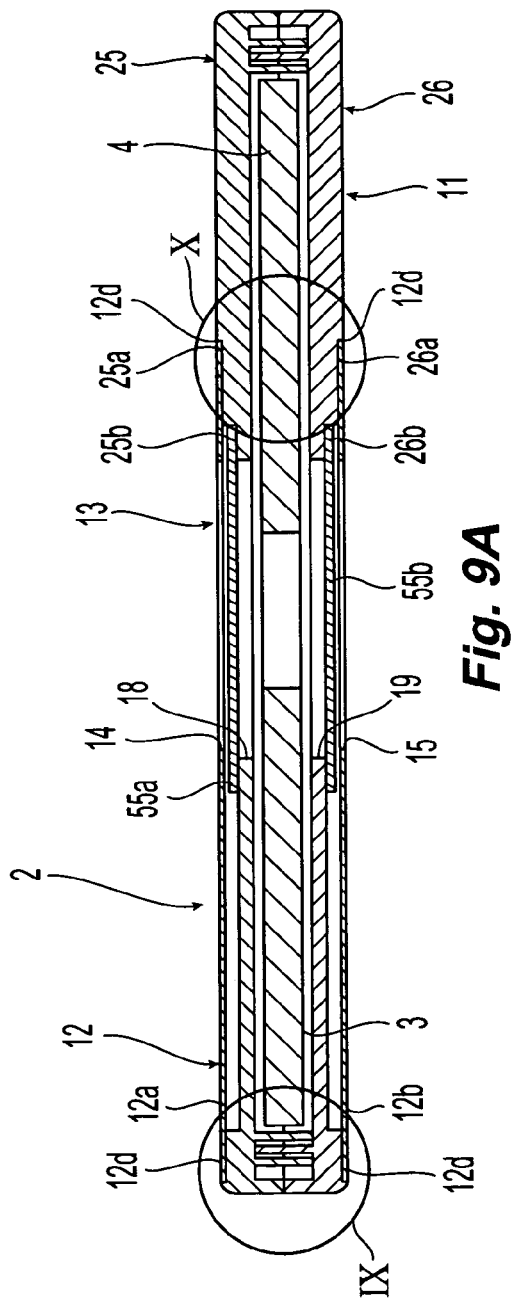
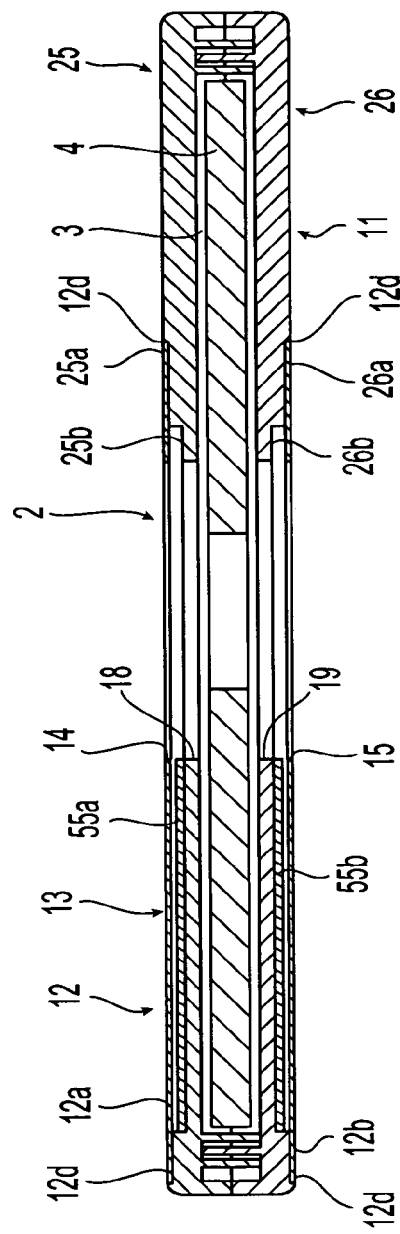
Fig. 9A
Fig. 9B

SYSTEM FOR RECORDING/REPRODUCING PHOTOSENSITIVE RECORDING MEDIUM

FIELD OF THE INVENTION

The present invention relates to a system for recording/reproducing a photosensitive recording medium such as a holographic recording medium. Particularly, it relates to a photosensitive recording medium recording/reproducing system having a cartridge for receiving and safekeeping a photosensitive recording medium in a light-shielded state, and a recording/reproducing device for recording data onto the photosensitive recording medium or reproducing recorded data from the photosensitive recording medium in a light-shielded state.

BACKGROUND OF THE INVENTION

A holographic recording medium for recording data by holography has been already invented (e.g. see JP-A-2004-029476). This holographic recording medium is a photosensitive recording medium which is formed in such a manner that a holographic recording layer made of a photosensitive material is provided on a disk type support. Since data are multiplexedly recorded as interference fringes of laser light into a multilayer on the holographic recording medium, the holographic recording medium can have a larger data recording volume than that of a DVD which was heretofore a popular recording medium. When light is exposed to the holographic recording layer or dust is deposited on the holographic recording layer, the performance of the holographic recording layer of the holographic recording medium is affected adversely. For this reason, the holographic recording medium is handled after received in a cartridge having a light-shielding function and a dust-proof function (e.g. see JP-A-2003-317422 (corresponding to US 2003/0198177 A1)).

In the invention described in JP-A-2004-029476, the holographic recording medium is received in a cartridge similar to a cartridge of a DVD-RAM. This cartridge is formed out of a material small in transmittance of light rays in a wavelength range in which the holographic recording layer is affected by the light rays. Although JP-A-2004-029476 did not give any description on the detailed configuration of the cartridge, it may be conceived that the cartridge has the same configuration as that of a cartridge described in JP-A-2003-317422 (corresponding to US 2003/0198177 A1).

In the invention described in JP-A-2003-317422 (corresponding to US 2003/0198177 A1), the cartridge is made of a material capable of blocking a sensitive color in the holographic recording layer. Moreover, a sponge-like shielding material is attached to a joint of a movable portion for exposing the holographic recording medium to the outside. In addition, in the description, the cartridge is provided with a cartridge body for receiving a recording medium therein in a desirably rotatable state, an opening provided in the cartridge body and for exposing part of the recording medium to the outside, and a shutter for opening/closing the opening.

SUMMARY OF THE INVENTION

In the cartridge for receiving the holographic recording medium, when light shielding and dust-proofing between the cartridge body and the shutter are not performed appropriately, light and dust go into the cartridge so as to give a bad influence to the holographic recording medium. Since the shutter of the cartridge is opened when data are recorded onto the holographic recording medium or reproduced from the holographic recording medium, a device for recording/reproducing the holographic recording medium needs to be shielded against light. When light shielding of the recording/reproducing device is not satisfactory, the holographic recording medium is exposed to light during recording or reproduction so that there is a possibility that data cannot be recorded/reproduced smoothly afterward.

In JP-A-2004-029476, however, there is no description about a light-shielding and dust-proofing structure between the cartridge body and the shutter. In the cartridge described in JP-A-2003-317422 (corresponding to US 2003/0198177 A1), although light shielding between the cartridge body and the shutter is performed by the sponge-like shielding material, there is a problem that proper light shielding and dust-proofing cannot be performed when the shielding material is peeled or deteriorates.

When the shutter is opened in the condition that the cartridge is in the outside of the device, the holographic recording layer is exposed to light so as to be unable to be used. However, the cartridge described in each of JP-A-2004-029476 and JP-A-2003-317422 (corresponding to US 2003/0198177 A1) has no measure taken to prevent the shutter from being opened erroneously. In addition, there is no description about a recording/reproducing device provided with a mechanism for preventing exposure to light.

The invention was developed under such circumstances. An object of the invention is to provide a highly reliable system for recording/reproducing a photosensitive recording medium, in which the photosensitive recording medium can be prevented from being exposed to light because the photosensitive recording medium is received in a light-shielded cartridge provided with an erroneous opening prevention mechanism and data are recorded onto the photosensitive recording medium and reproduced from the photosensitive recording medium after the cartridge is inserted into a light-shielded recording/reproducing device.

The object of the invention is achieved by a system for recording/reproducing a photosensitive recording medium as follows.

(1) A system for recording/reproducing a photosensitive recording medium, having: a photosensitive recording medium cartridge including a cartridge body, a shutter, and a lock mechanism, the cartridge body receiving a photosensitive recording medium therein so that the photosensitive recording medium can rotate, the cartridge body having an opening for exposing a center and a recording surface of the photosensitive recording medium to the outside, the shutter being attached to the outside of the cartridge body so as to be disposed movably between a close position for closing the opening and an open position for opening the opening, the lock mechanism being provided for locking the shutter in the close position; and a recording/reproducing device including a housing, an insertion port shutter, an unlock mechanism, and a shutter opening mechanism, the housing being provided with an insertion port through which the photosensitive recording medium cartridge can be inserted into the housing, the housing having an internal space shielded from external light, the insertion port shutter being provided to open/close the insertion port desirably so that the insertion port shutter shields the insertion port from external light when the insertion port is closed, the unlock mechanism being provided for releasing the lock based on the lock mechanism when the photosensitive recording medium cartridge is inserted, the shutter opening mechanism being provided for opening the shutter of the photosensitive recording medium cartridge when the photosensitive recording medium cartridge is inserted into a predetermined position and the inside of the housing is shielded from light.

According to the photosensitive recording medium recording/reproducing system configured thus, the photosensitive recording medium is received in the cartridge which is shielded from light by the shutter and which is provided with the lock mechanism for locking the shutter in the close position, so that the photosensitive recording medium can be received in the cartridge while surely prevented from being exposed to light because the shutter is not opened erroneously. After the cartridge is inserted into the recording/reproducing device shielded against light, the lock based on the lock mechanism is released to thereby open the shutter. Accordingly, the photosensitive recording medium at the time of recording/reproduction can be prevented from being exposed to light.

(2) A system for recording/reproducing a photosensitive recording medium according to the paragraph (1), wherein the lock mechanism of the photosensitive recording medium cartridge has: a first lock member provided so that the first lock member can move between a first lock position for preventing the shutter from moving to the open position and a first unlock position for permitting the shutter to move to the open position; and a second lock member provided so that the second lock member can move between a second lock position for preventing the first lock member from moving to the first unlock position and a second unlock position for permitting the first lock member to move to the first unlock position.

According to the photosensitive recording medium recording/reproducing system configured thus, the lock mechanism of the cartridge includes the first lock member and the second lock member. Since the first and second lock members of the lock mechanism perform double lock, the shutter can be surely prevented from being opened erroneously, so that the photosensitive recording medium can be prevented from being exposed to light due to an erroneous operation.

(3) A system for recording/reproducing a photosensitive recording medium according to the paragraph (1) or (2), wherein the unlock mechanism has: a second unlock member fixed to the inside of the housing of the recording/reproducing device so that when the photosensitive recording medium cartridge is inserted through the insertion port, the second unlock member engages with the second lock member and moves the second lock member to the second unlock position; and a first unlock member fixed to the inside of the housing of the recording/reproducing device so that after the second lock member moves to the second unlock position, the first unlock member engages with the first lock member and moves the first lock member to the first unlock position, and wherein the lock based on the lock mechanism is released automatically when the photosensitive recording medium cartridge is inserted through the insertion port.

According to the photosensitive recording medium recording/reproducing system configured thus, when the cartridge is inserted into the recording/reproducing device through the insertion port, the second and first lock members of the lock mechanism successively engage with the second and first unlock members provided in the inside of the housing of the recording/reproducing device, so that the double lock based on the lock mechanism is released automatically. Accordingly, the lock based on the lock mechanism can be released by a simple operation of inserting the cartridge into the recording/reproducing device in spite of the double lock. Accordingly, a system for recording/reproducing a photosensitive recording medium with high safety and excellent operability can be provided.

(4) A system for recording/reproducing a photosensitive recording medium according to any one of the paragraphs (1) through (3), wherein the recording/reproducing device further includes a shutter opening/closing detection sensor for detecting opening/closing of the insertion port shutter, and wherein a light-shielded state of the inside of the housing is decided when the presence of the insertion port shutter in the close position port is detected by the shutter opening/closing detection sensor.

According to the photosensitive recording medium recording/reproducing system configured thus, the shutter is opened after closing of the insertion port shutter is detected by the shutter opening/closing detection sensor. Accordingly, the photosensitive recording medium in the recording/reproducing device can be surely prevented from being exposed to light so that data can be recorded/reproduced with high reliability.

(5) A system for recording/reproducing a photosensitive recording medium according to any one of the paragraphs (1) through (3), wherein the recording/reproducing device further includes an illuminance sensor for detecting illuminance in the inside of the housing, and wherein a light-shielded state of the inside of the housing is decided when illuminance not higher than a predetermined value is detected by the illuminance sensor.

According to the photosensitive recording medium recording/reproducing system configured thus, when illuminnace not higher than a predetermined value is detected in the inside of the housing by the illuminance sensor, the shutter is allowed to be opened. Accordingly, the photosensitive recording medium can be surely prevented from being exposed to light.

(6) A system for recording/reproducing a photosensitive recording medium according to any one of the paragraphs (1) through (5), wherein the photosensitive recording medium is a holographic recording medium.

According to the photosensitive recording medium recording/reproducing system configured thus, data can be recorded/reproduced in the condition that the holographic recording medium is received without exposure to light.

According to the system for recording/reproducing a photosensitive recording medium according to the invention, it is possible to a highly reliable system for recording/reproducing a photosensitive recording medium, in which a photosensitive recording medium is received in a light-shielded cartridge provided with an erroneous opening prevention mechanism and data are recorded onto the photosensitive recording medium and reproduced from the photosensitive recording medium after the cartridge is inserted into a light-shielded recording/reproducing device.

BRIEF DESCRIPTION OF THE DRAWINGS

FIGS. 8A, 8B and 8C are sectional views of the cartridge in a mounting direction, in which FIG. 8A is an overall view, FIG. 8B is an enlarged view of a front end edge portion of FIG. 8A, and FIG. 8C is an enlarged view of a rear end edge portion of FIG. 8A.

FIGS. 9A and 9B are sectional views of the cartridge in a direction perpendicular to the mounting direction, in which FIG. 9A is a sectional view showing a state in which the shutter is closed and FIG. 9B is a sectional view showing a state in which the shutter is opened.

DETAILED DESCRIPTION OF THE INVENTION

Figure 1:
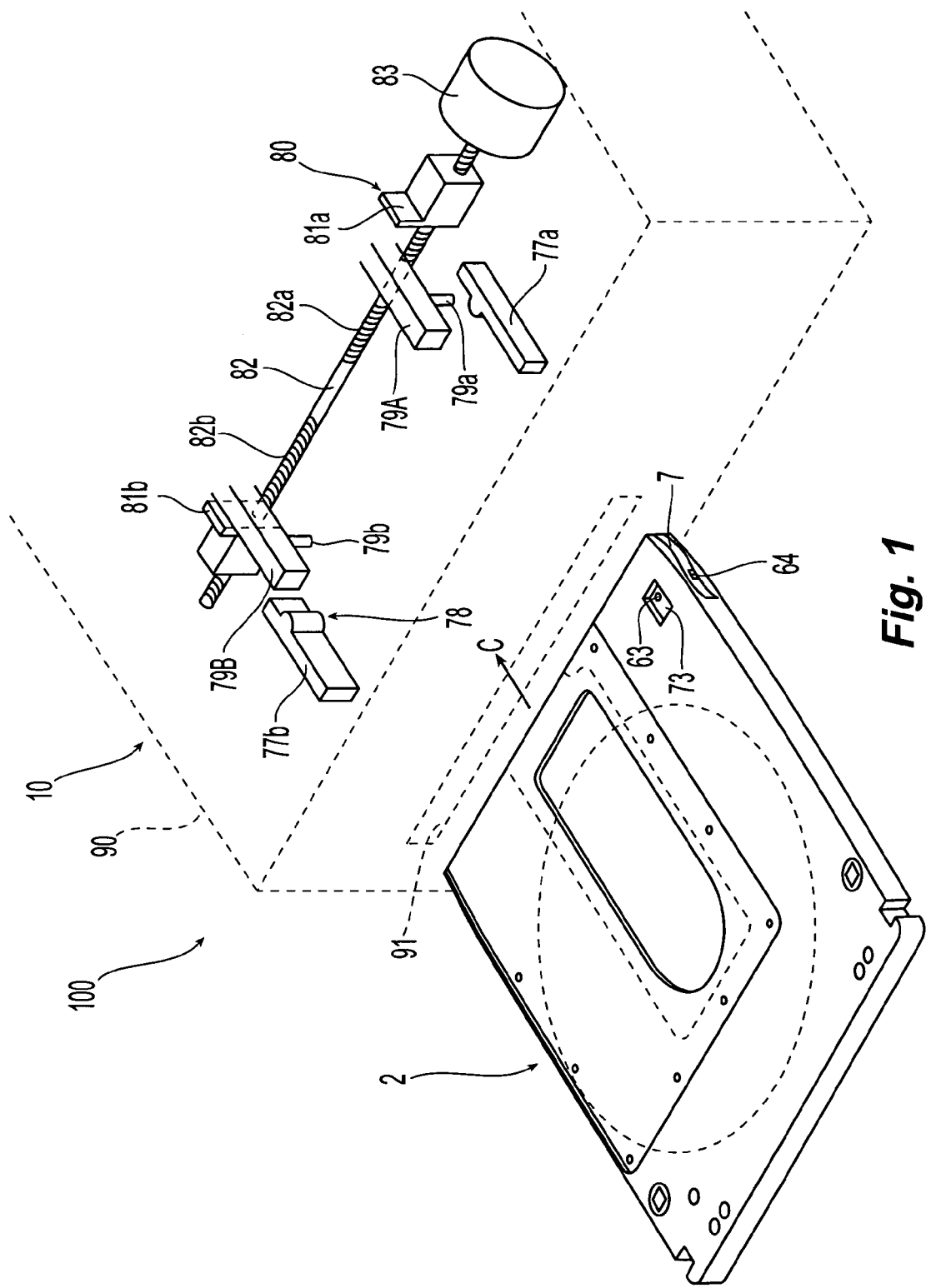
FIG. 1 is a perspective view showing the configuration of a recording/reproducing system according to an embodiment of the invention.
Figure 2:
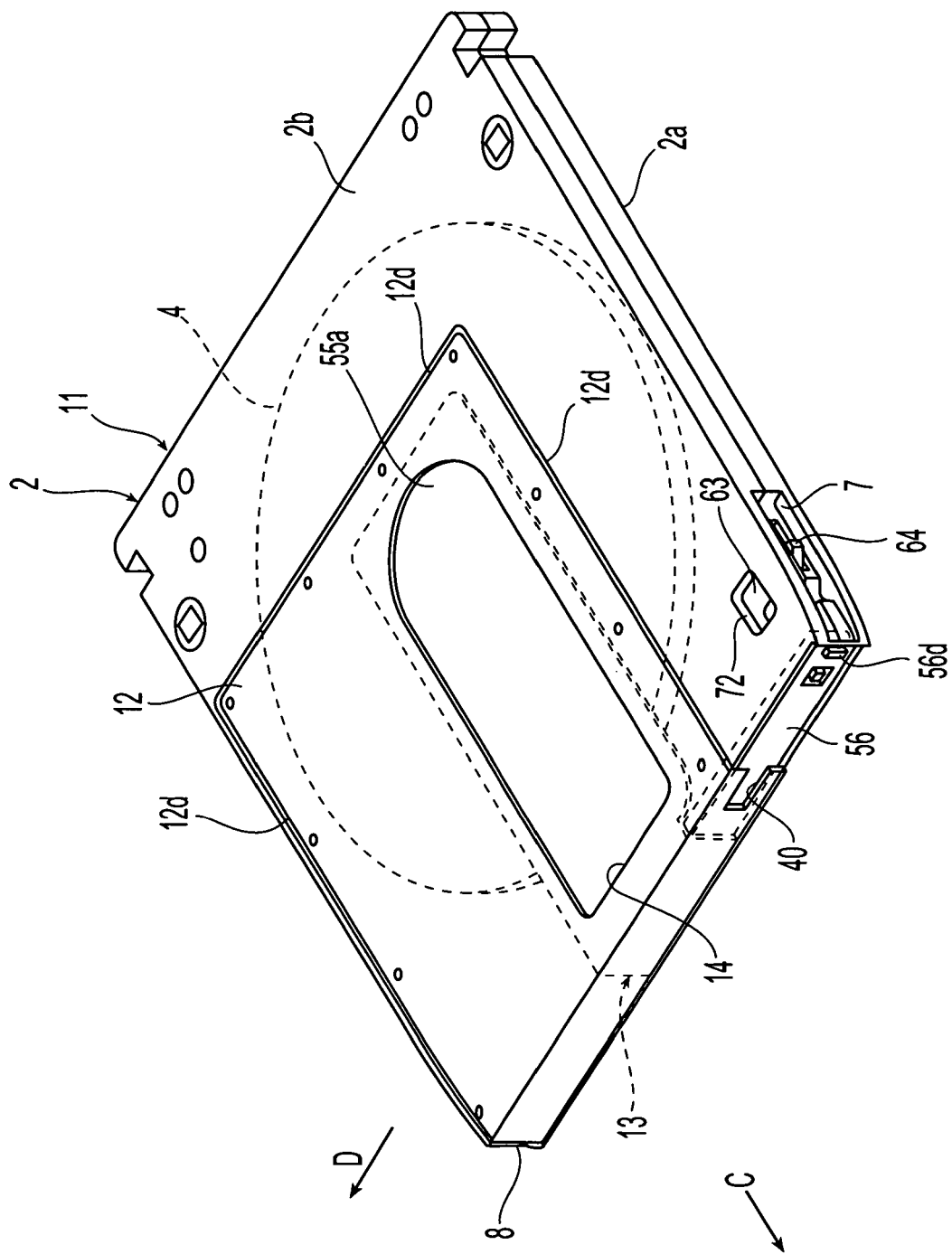
FIG. 2 is a perspective view showing the shape of an external appearance of a cartridge.
Figure 3:
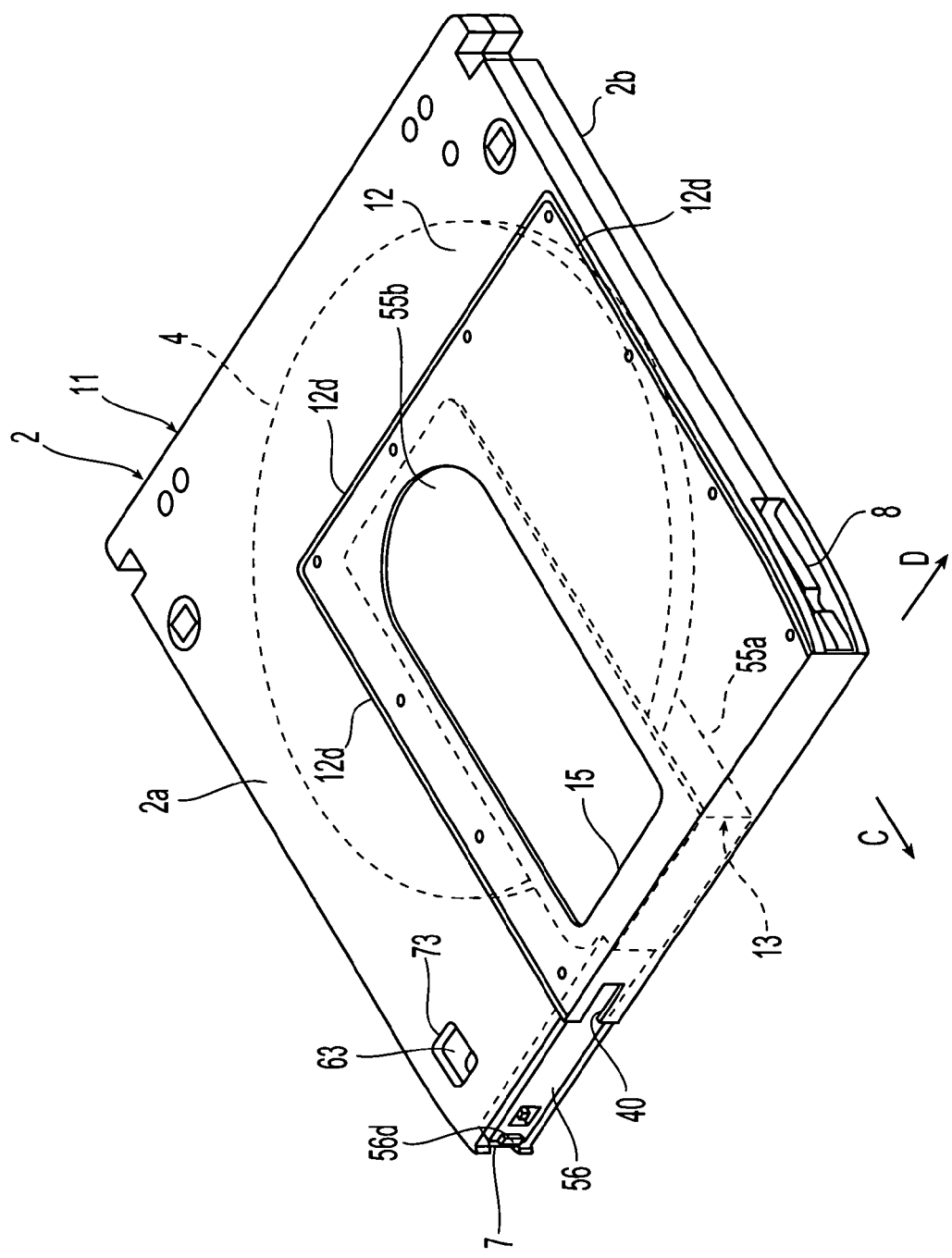
FIG. 3 is a perspective view showing the shape of an external appearance of an opposite surface of the cartridge.
Figure 4:
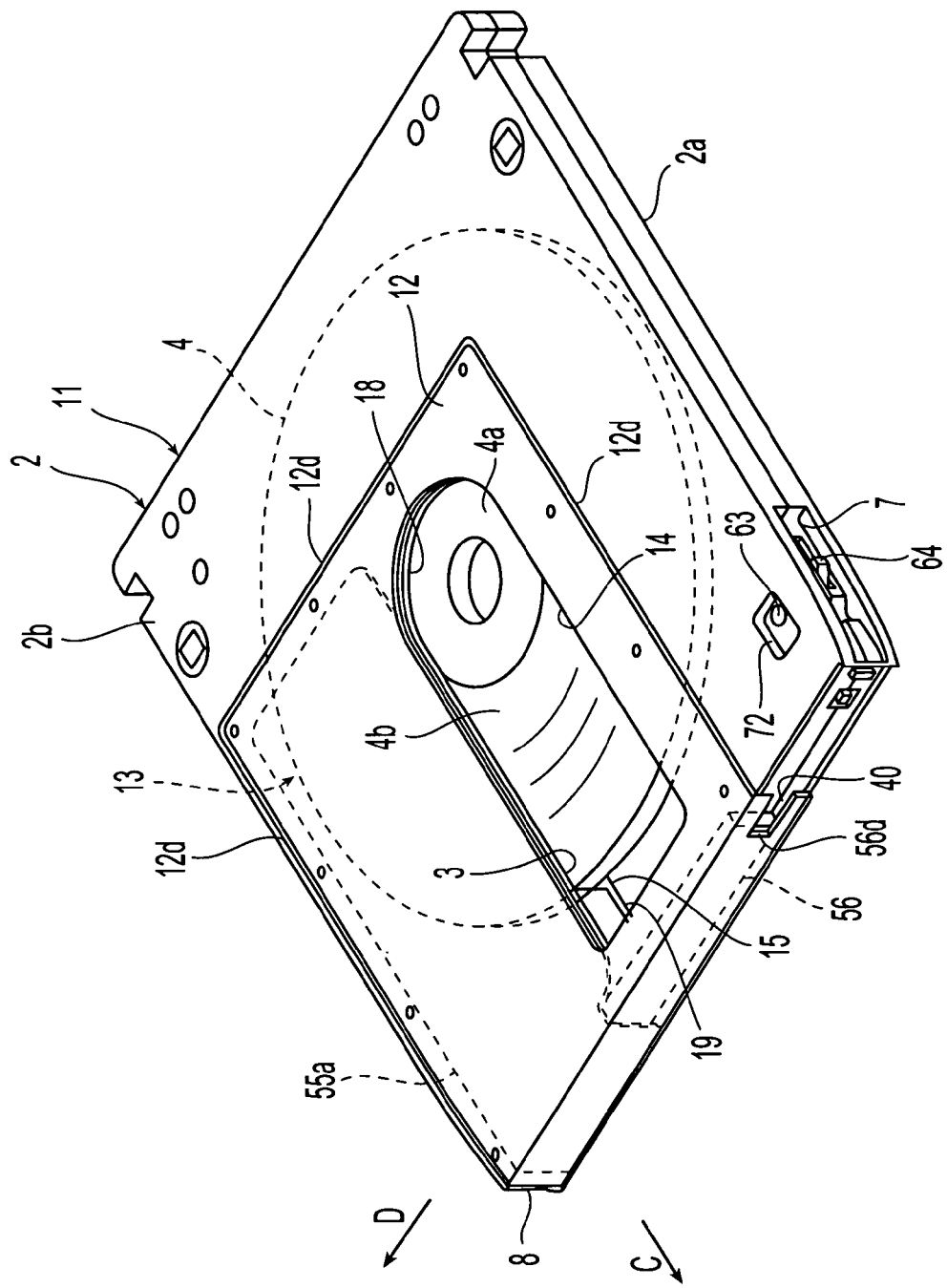
FIG. 4 is an external appearance perspective view showing a shutter opening state of the cartridge.

An embodiment of the invention will be described below in detail with reference to the drawings. FIG. 1 is a perspective view showing the configuration of a recording/reproducing system according to an embodiment of the invention. FIGS. 2 to 4 are perspective views each showing the shape of an external appearance of a holographic recording medium cartridge (hereinafter abbreviated to cartridge). FIG. 2 is a perspective view showing a state in which a surface of the cartridge faces up. FIG. 3 is a perspective view showing a state in which an opposite surface of the cartridge faces up. FIG. 4 is a perspective view showing a state in which a shutter is in an open position and a holographic recording medium (hereinafter referred to as recording disk) shaped like a disk is received rotatably in a disk storage portion.

As shown in FIG. 1, a recording/reproducing system 100 includes a cartridge 2 and a recording/reproducing device 10. The cartridge 2 will be described first. As shown in FIGS. 1 to 4, the cartridge 2 is mounted, in a direction of an arrow C, into the recording/reproducing device 10 such as a holographic recording device for handling the cartridge. Positioning grooves 7 and 8 are provided in opposite side surfaces of a front end of the cartridge 2 in the mounting direction. When the cartridge 2 is mounted in the recording/reproducing device 10 such as a holographic recording device, positioning members provided in the recording/reproducing device 10 are inserted into the positioning grooves 7 and 8.

A recording disk 4 is a holographic recording disk having a hole formed in its central portion. Holographic recording layers are provided in opposite surfaces of the recording disk 4. For example, on each of the holographic recording layers, data are recorded into a multilayer as interference fringes of laser light by the laser light in a range of from a green wavelength of 532 nm to a blue wavelength of 405 nm. Incidentally, a reinforcement material may be added to the hole portion of the recording disk 4. In order to record data on the opposite recording surfaces of the recording disk 4, the cartridge 2 is set in the recording/reproducing device (holographic recording device) 10 when the cartridge 2 is mounted in the recording/reproducing device 10 having an A surface 2a or a B surface 2b facing up.

The cartridge 2 includes a cartridge body 11, a shielding plate 12, and a shutter 13. A disk storage portion 3 is provided in the cartridge body 11. The shielding plate 12 is attached to the outside of the cartridge body 11 so as to sandwich the cartridge body 11. The shutter 13 is put between the cartridge body 11 and the shielding plate 12. Outer holes 14 and 15 each substantially shaped like a rectangle as a second opening are formed in upper and lower surfaces of the shielding plate 12, respectively. These outer holes 14 and 15 are closed with a first shutter 55a and a second shutter 55b when the shutter 13 is in a close position.

When the shutter 13 is moved to an open position in a direction of an arrow D as shown in FIG. 4, inner holes 18 and 19 having the same shapes and provided in the cartridge body 11 are opened together with the outer holes 14 and 15, so as to face the outer holes 14 and 15 respectively. Thus, a central portion 4a and recording surfaces 4b of the recording disk 4 which is received in the disk storage portion 3 are exposed to the outside.

The shutter 13 is urged to a close position by an internal shutter spring and locked in the close position by a lock mechanism. The lock based on the lock mechanism is released in such a manner that while a second lock member 64 protruding in the positioning groove 7 is forced into the inside of the cartridge 2, a first lock member 63 exposed from openings 73 and 72 in the A surface 2a and the B surface 2b of the cartridge 2 is slid toward a rear end side of the cartridge in the mounting direction. In this manner, the shutter 13 is locked in the close position by the lock mechanism in the condition that the shutter 13 cannot be unlocked without the two-stage operation. Accordingly, the shutter 13 is prevented from being opened unintentionally.

Figure 5:
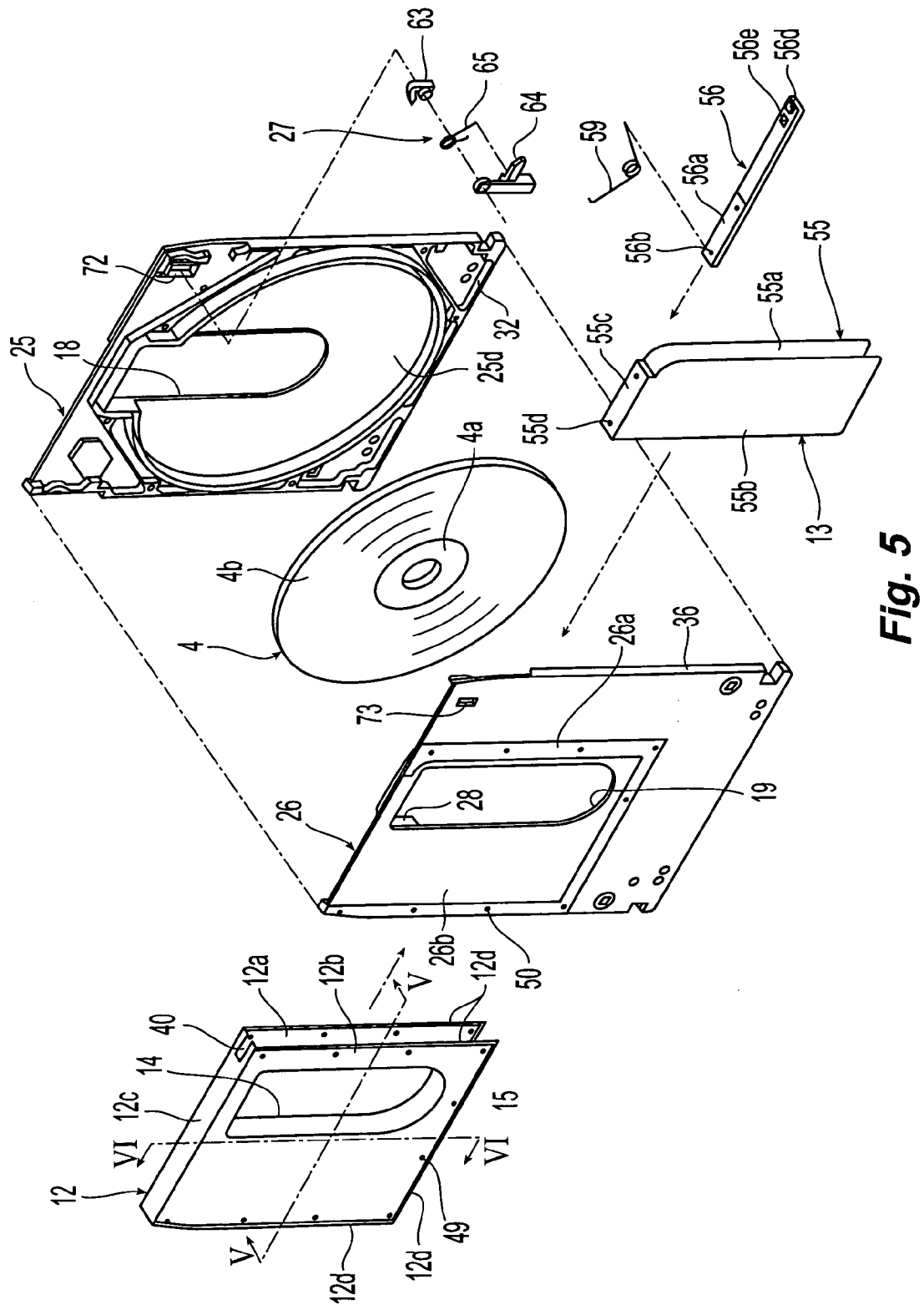
FIG. 5 is an exploded perspective view showing the configuration of the cartridge.
Figure 6:
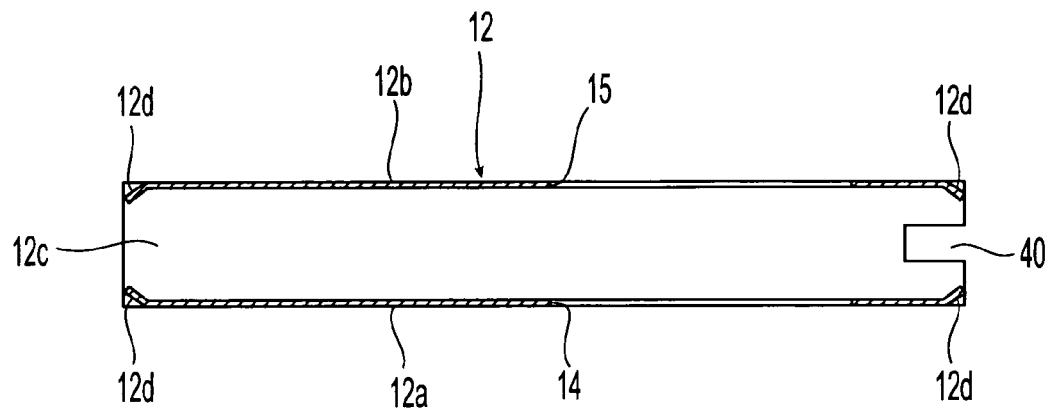
FIG. 6 is a sectional view taken on the line V-V in FIG. 5.
Figure 7:
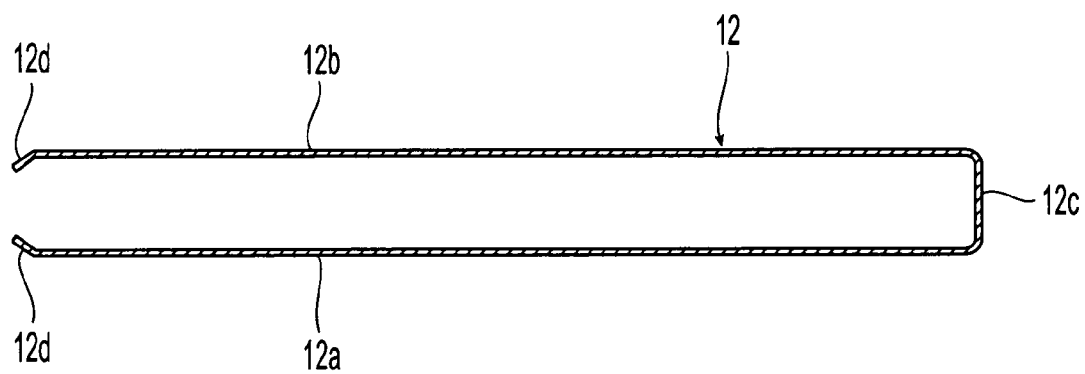
FIG. 7 is a sectional view take on the lie VI-VI in FIG. 5.
Figure 10:
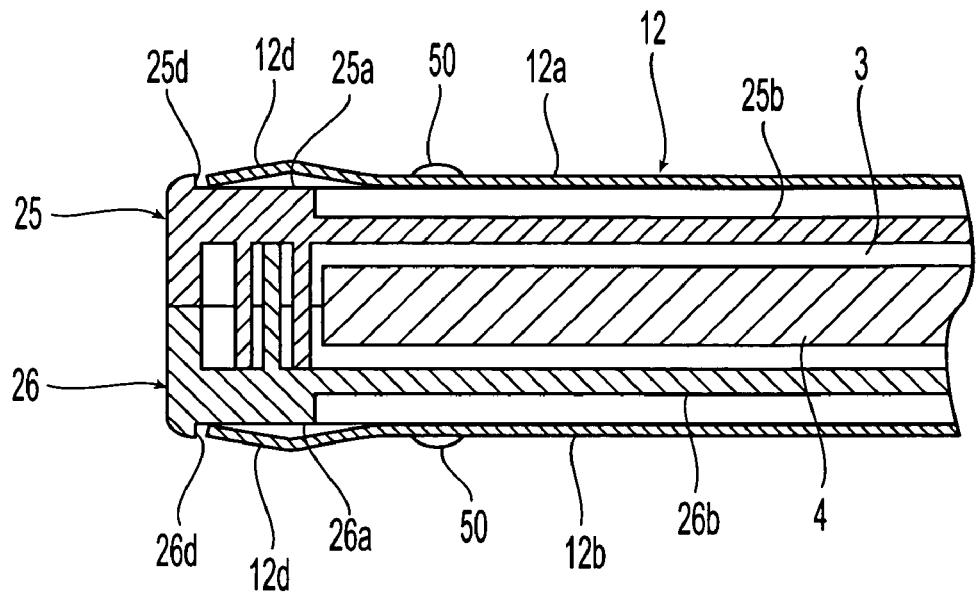
FIG. 10 is an enlarged view of a portion enclosed by a circle IX in FIG. 9A.
Figure 11:
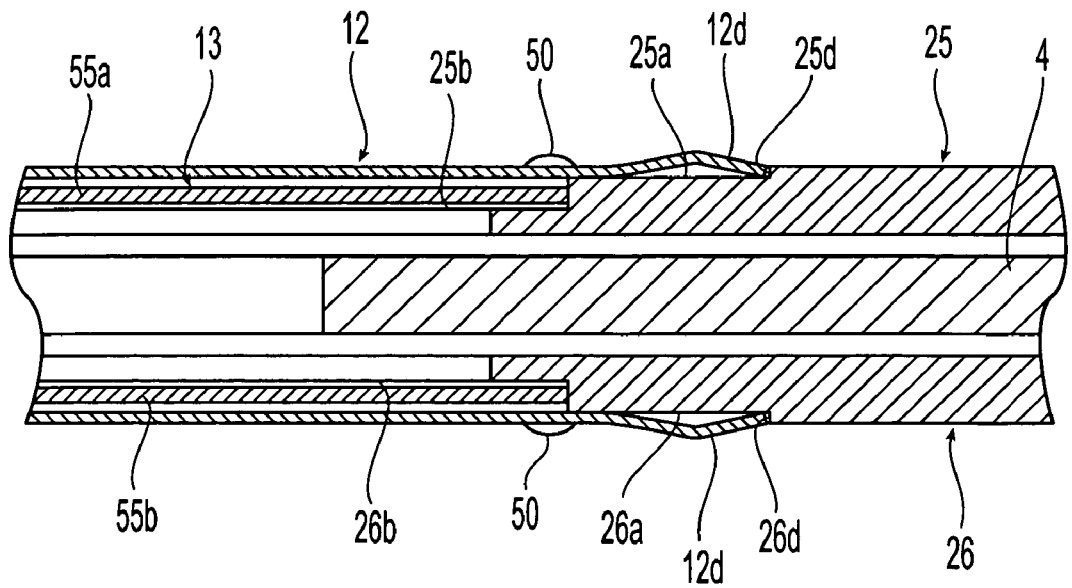
FIG. 11 is an enlarged view of a portion enclosed by a circle X in FIG. 9A.

FIG. 5 is an exploded perspective view showing the configuration of the cartridge. FIG. 6 is a sectional view taken on the line V-V in FIG. 5. FIG. 7 is a sectional view taken on the line VI-VI in FIG. 5. FIG. 8A is a sectional view of the cartridge in the mounting direction. FIG. 8B is an enlarged view of a front end edge portion in FIG. 8A. FIG. 8C is an enlarged view of a rear end edge portion in FIG. 8A. FIGS. 9A and 9B are sectional views of the cartridge in a direction perpendicular to the mounting direction. FIG. 9A is a sectional view of a state in which the shutter is closed. FIG. 9B is a sectional view of a state in which the shutter is opened. FIG. 10 is an enlarged view of a portion enclosed with a circle IX in FIG. 9A. FIG. 11 is an enlarged view of a portion enclosed with a circle X in FIG. 9A.

As shown in FIG. 5, the cartridge body 11 includes a first shell 25 substantially shaped like a plate, a second shell 26 connected to the first shell 25, and a lock mechanism 27 put between the first shell 25 and the second shell 26 for locking the shutter 13.

For example, the first shell 25 and the second shell 26 are formed by injection molding out of identical or similar thermoplastic resins each containing additives of a shielding substance and a lubricant. As shown in FIG. 8C which is an enlarged sectional view of the rear end edge portion of the cartridge 2, a first shielding wall 30, a second shielding wall 31 and a protrusion 32 are provided in the inner surface of the first shell 25. The first shielding wall 30 is a protrusion formed into a size with a diameter larger than the outer diameter of the recording disk 4. The second shielding wall 31 is provided in the outside of the first shielding wall 30. The protrusion 32 is provided in the whole circumference of the end edge. The inner hole 18 exposing the central portion 4a and the recording surface 4b of the recording disk 4 to the outside is provided in the inside of the first shielding wall 30.

A third shielding wall 35 and a protrusion 36 are provided in the inner surface of the second shell 26. The third shielding wall 35 is a protrusion formed into a size with a diameter larger than the outer diameter of the recording disk 4. The third shielding wall 35 is inserted between the first shielding wall 30 and the second shielding wall 31 of the first shell 25. The protrusion 36 is provided in the whole circumference of the end edge. An inner hole 19 exposing the central portion 4a and the recording surface 4b of the recording disk 4 to the outside is provided in the inside of the third shielding wall 35.

When the recording disk 4 is placed in the inside of the third shielding wall 35 of the second shell 26 and the first shell 25 is superimposed on the upper surface of the second shell 26, the third shielding wall 35 is inserted between the first shielding wall 30 and the second shielding wall 31 so that the front end of the third shielding wall 35 abuts on an inner surface 25e of the first shell 25. The disk storage portion 3 is formed by these shielding walls 30, 31 and 35 and the inner surfaces of the first and second shells 25 and 26. The side wall of the disk storage portion 3 is formed in a labyrinth type shielding structure complicatedly made of the three shielding walls 30, 31 and 35. With this structure, even when light or dust enters through a joint between the first and second shells 25 and 26, the light or dust never goes into the disk storage portion 3.

The front end of the third shielding wall 35 of the second shell 26 is fixed to the inner surface 25e of the first shell 25 by ultrasonic welding. Accordingly, the first shell 25 and the second shell 26 are bonded firmly to each other so that no gap is formed in the joint between the first shell 25 and the second shell 26.

As shown in FIG. 5, FIGS. 8A to 8C, FIGS. 9A and 9B, FIG. 10 and FIG. 11, the outer surfaces of the first shell 25 and the second shell 26 have step portions 25d and 26d formed into a size slightly larger than the shape of the shielding plate 12 and with a depth not smaller than the thickness of the shielding plate 12 so that shielding plate attaching surfaces 25a and 26a offset inward are formed.

For example, an aluminum alloy which can obtain shielding performance, corrosion resistance, decoration effect and processing characteristic and which is light in weight and strong is used as the material of the shielding plate 12. Although the shielding plate 12 is formed out of a plastic resin, a plastic resin containing additives of a shielding substance and a lubricant may be used in order to secure shielding performance and slidability of the shutter 13.

As shown in FIGS. 5 to 7, the shielding plate 12 is formed by making outer holes 14 and 15 and a notch 40 for gaining a movement range of the shutter 13 in a thin aluminum alloy plate and bending the thin aluminum alloy plate substantially into a U shape in section. In this manner, the shielding plate 12 is provided with a first plate portion 12a having the outer hole 14, a second plate portion 12b having the outer hole 15, and a third plate portion 12c including the notch 40 and connected to the first and second plate portions 12a and 12b.

A ridgeline between the third plate portion 12c and each of the first and second plate portions 12a and 12b, and each intersection portion between each of the opposite sides of the cartridge 2 in the mounting direction C and one side in the direction perpendicular to the mounting direction C are cut and outer circumferential end portions of the first and second plate portions 12a and 12b are bent substantially into inverted V shapes in such directions that the outer circumferential end portions of the first and second plate portions 12a and 12b approach each other (i.e. in such directions that the outer circumferential end portions of the first and second plate portions 12a and 12b face the cartridge body 11 when the shielding plate 12 is attached to the cartridge body 11). In this manner, bent portions 12d substantially shaped like inverted V figures are formed in the outer circumferential end portions of the first and second plate portions 12a and 12b. Although the bent portions 12d are preferably formed in all the three sides of the outer circumferential end portions in view of shielding performance, the invention is not limited thereto.

The shielding plate 12 is attached to the shielding plate attaching surfaces 25a and 26a of the cartridge body 11 in such a manner that the B surface 2b and the A surface 2a of the cartridge body 11 are sandwiched by the first and second plate portions 12a and 12b and the front end of the cartridge body 11 in the mounting direction C is covered with the third plate portion 12c. The shielding plate attaching surfaces 25a and 26a are offset inward to have a depth not smaller than the thickness of the shielding plate 12 so that the outer surface of the shielding plate 12 attached to the cartridge body 11 does not protrude from the surface of the cartridge 2. As shown in FIGS. 8A to 8C, FIGS. 9A and 9B, FIG. 10 and FIG. 11, front ends of the bent portions 12d of the first and second plate portions 12a and 12b are located opposite to the stage portions 25d and 26d of the first and second shells 25 and 26, respectively.

As shown in FIG. 5, small holes 49 are formed at intervals of an approximately equal pitch in the outer circumferences of the first and second plate portions 12a and 12b of the shielding plate 12. Pins 50 each having a length slightly larger than the thickness of the shielding plate 12 are formed integrally with the shielding plate attaching surfaces 25a and 26a of the first and second shells 25 and 26 in positions corresponding to the holes 49 of the shielding plate 12.

As shown in FIGS. 8A to 8C, FIGS. 9A and 9B, FIG. 10 and FIG. 11, when the shielding plate 12 is attached to the outside of the cartridge body 11 (the shielding plate attaching surfaces 25a and 26a), the pins 50 of the first and second shells 25 and 26 are inserted into the holes 49 so as to protrude from the surface of the shielding plate 12. The shielding plate 12 is fixed to the cartridge body 11 in such a manner that front ends of the pins 50 are melted down by heat while the front end portions of the bent portions 12d are pressed against elastic force of the shielding plate 12 onto the shielding plate attaching surfaces 25a and 26a.

In this manner, the front ends of the bent portions 12d of the shielding plate 12 are located opposite to the step portions 25d and 26d respectively. At the same time, by the elastic force of the shielding plate 12, the front ends of the bent portions 12d are pressed onto the shielding plate attaching surfaces 25a and 26a so as to abut thereon without having any gap. That is, the outer circumferential end portions of the shielding plate 12 (the front ends of all the bent portions 12d) are brought into tight contact with the shielding plate attaching surfaces 25a and 26a with no gap formed therebetween. Further, the outer circumferential end portions of the shielding plate 12 are covered with the step portions 25d and 26d. Accordingly, entrance of light can be prevented and shielded surely even if there is a gap formed partially due to error in component accuracy etc.

In addition to the aforementioned method, an adhesive agent, double-sided adhesive tape, screwing, etc. may be used as the method for fixing the shielding plate 12 to the cartridge body 11. When the shielding plate 12 is molded out of a plastic resin, various kinds of welding can be used.

As shown in FIG. 5, the shutter 13 includes a shutter member 55 and a slide member 56. The shutter member 55 is formed by bending a thin shielding plate substantially into a U shape. The slide member 56 is formed into a long and narrow plate shape and attached to the shutter member 55. For example, the shutter member 55 is formed out of an aluminum alloy for the same reason as the shielding plate 12. Incidentally, the shutter member 55 may be formed out of a plastic resin. In order to ensure shielding performance and slidability, a plastic resin containing additives of a shielding substance and a lubricant is preferably used. The slide member 56 is formed out of a plastic resin containing additives of a shielding substance and a lubricant.

The shutter member 55 includes a first shutter 55a, a second shutter 55b and a joint 55c. The first shutter 55a is inserted between the outer surface of the first shell 25 and the first plate portion 12a of the shielding plate 12. The second shutter 55b is inserted between the outer surface of the second shell 26 and the second plate portion 12b of the shielding plate 12. The joint 55c is connected to the first and second shutters 55 and 56 while the second shutter 56 is attached to the joint 55c.

Shutter sliding surfaces 25b and 26b offset inward to have a depth not smaller than the thickness of the shutter member 55 are formed in the inside of the shielding plate attaching surfaces 25a and 26a in the outer surfaces of the first and second shells 25 and 26. In this manner, the shutter 13 can move between the cartridge body 11 and the shielding plate 12 so smoothly that generation of chips etc. due to the movement of the shutter 13 can be suppressed. Incidentally, the shutter sliding surfaces 25b and 26b may be roughened in order to diffuse incident light. Similarly, the inner surface of the shielding plate 12 and the inner and outer surfaces of the shutter 13 may be roughened.

The slide member 56 is put slidably between the first shell 25 and the second shell 26 so that the upper surface of the slide member 56 is exposed from the front end surface of the cartridge body 11 in the mounting direction. An attachment surface 56a is provided in one end portion of the upper surface of the slide member 56 so as to be attached to the inner surface of the joint 55c of the shutter member 55. For example, two pins 56b are formed integrally with the attachment surface 56a. When the two pins 56b are inserted into two holes 55d provided in the joint 55c and front ends of the pins 56s are melted down by heat, the shutter member 55 and the slide member 56 are fixed to each other. Incidentally, an adhesive agent, double-sided adhesive tape, etc. may be used for the fixation. Various kinds of welding may be used when the shutter member 55 is formed out of a plastic resin. Screwing may be used.

Figure 12:
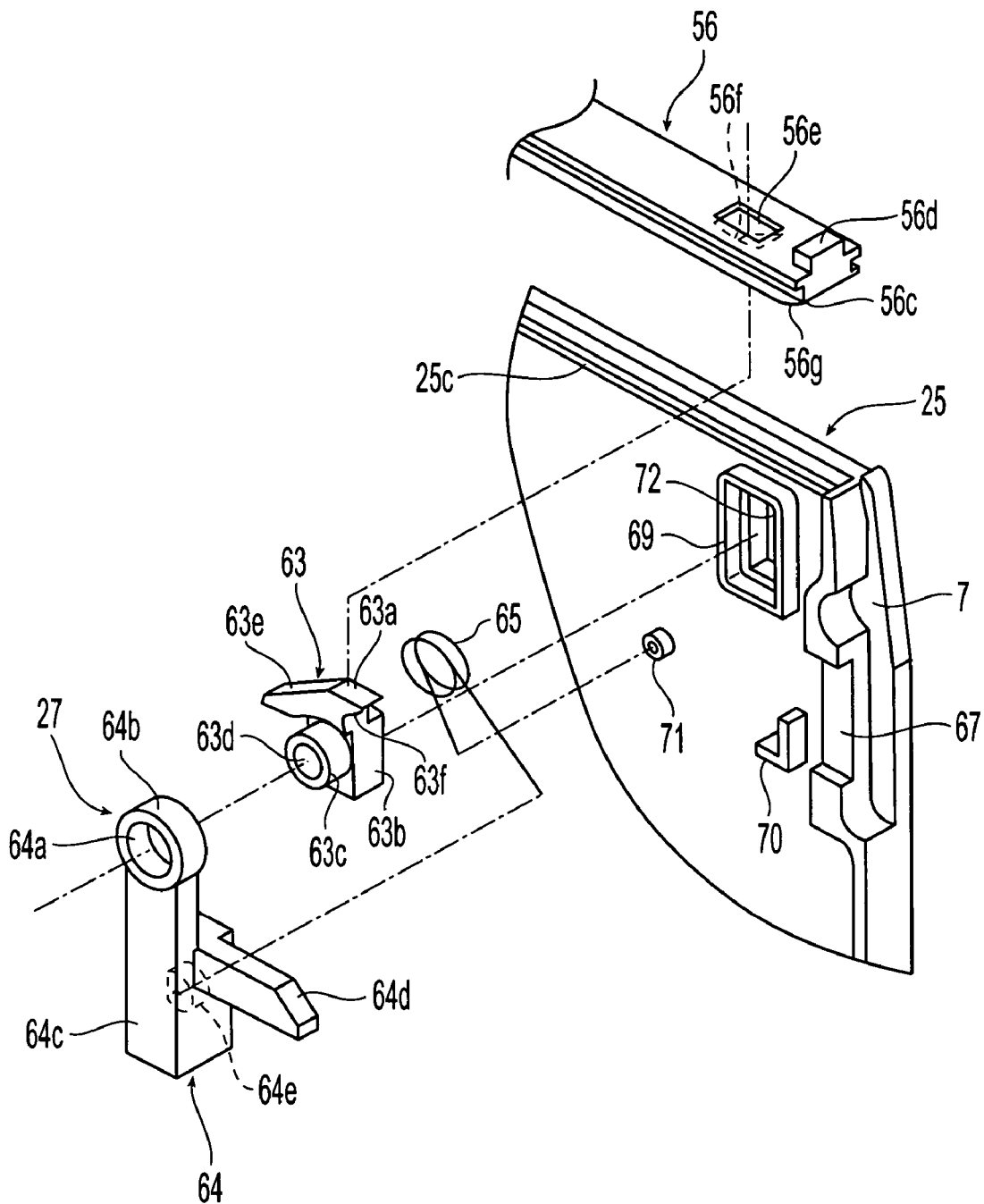
FIG. 12 is an exploded perspective view showing the configuration of a lock mechanism.

As shown in FIG. 8B and FIG. 12, grooves 56c are formed along a longitudinal direction in side surfaces of the slide member 56. Protrusions 25c and 26c provided in the inner surfaces of the first and second shells 25 and 26 on the front end side in the mounting direction are inserted into the grooves 56c. By means of the grooves 56c and the protrusions 25c and 26c, the slide member 56 can be slid without being displaced from the cartridge body 11.

A to-be-operated portion 56d to be operated for opening the shutter 13 is formed integrally with the other end portion of the upper surface of the slide member 56. When the to-be-operated portion 56d provided thus is operated to extend the slide member 56 with respect to the shutter member 55 in a direction to close the shutter, the slide member 56 is exposed to the outside without being hidden by the third plate portion 12c of the shielding plate 12. The notch 40 in the third plate portion 12c of the shielding plate 12 is provided for avoiding interference with the to-be-operated portion 56d when the shutter 13 is moved to the open position (see FIG. 4).

The shutter 13 is urged in the closing direction by a shutter spring 59. For example, the shutter spring 59 is made of a torsion coil spring. Opposite ends of the shutter spring 59 are stopped by the slider member 56 and the inner surface of the first shell 25.

Figure 13A:
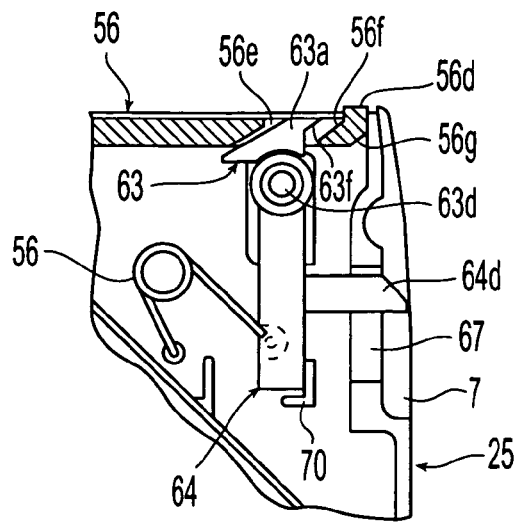
FIGS. 13A, 13B to 13C are views for explaining operation of the lock mechanism shown in FIG. 12.
Figure 13B:
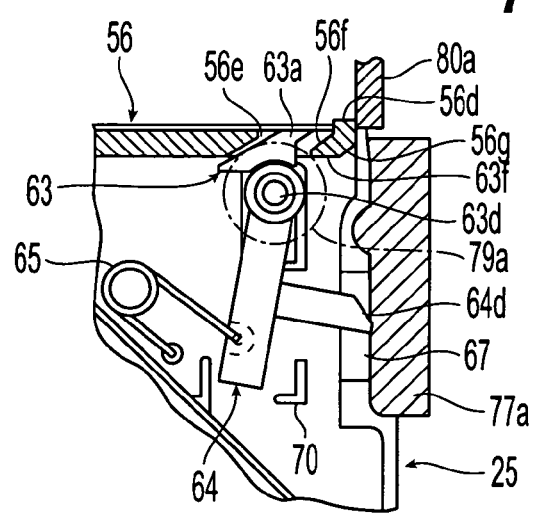
Figure 13C:
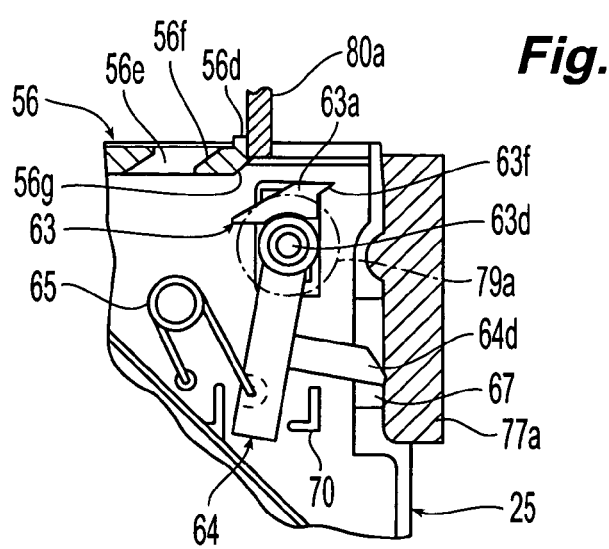

A lockable groove 56e shaped like a rectangular hole is formed in the slide member 56 adjacently to the to-be-operated portion 56d. An engagement inclined surface 56f inclined to the other end side (on the to-be-operated portion 56d side) of the slide member 56 little by little in the direction toward the front end of the cartridge 2 in the mounting direction C is formed in the outer side surface of the lockable groove 56e in the longitudinal direction of the slide member 56 (see FIGS. 13A to 13C). A corner portion between a right end surface and a lower surface of the slide member 56 as shown in FIGS. 13A to 13C is chamfered so as to form a guide inclined surface 56g substantially in parallel to the engagement inclined surface 56f.

Next, the lock mechanism will be described with reference to FIG. 12 and FIGS. 13A to 13C. FIG. 12 is an exploded perspective view showing the configuration of the lock mechanism. FIGS. 13A to 13C are views for explaining operation of the lock mechanism shown in FIG. 12. As shown in FIG. 12, a lock mechanism 27 includes a first lock member 63, a second lock member 64, and a lock spring 65. The first lock member 63 locks the shutter 13 in the close position. The second lock member 64 locks movement of the first lock member 63. The lock spring 65 urges the second lock member 64 in an illustrated counterclockwise direction and upward.

The first lock member 63 includes a lock pawl 63a, a rectangular slide portion 63b, a cylindrical boss 63c, and an operation hole 63d. The lock pawl 63a locks the shutter 13 in the close position when the lock pawl 63a engages with the lockable groove 56e formed in the slide member 56. The slide portion 63b is provided integrally with the lock pawl 63a. The boss 63c is formed in a surface of the slide portion 63b facing the second shell 26. The operation hole 63d is formed by perforating the boss 63c and the slide portion 63b.

As illustrated in FIG. 12 and FIGS. 13A to 13C, a slope 63e provided for inducing engagement with the lockable groove 56e when the shutter 13 is moved from the open position to the close position is formed in the left side of the lock pawl 63a substantially in parallel with the engagement inclined surface 56f of the slide member 56. A hook portion 63f which is an inclined surface substantially parallel to the engagement inclined surface 56f of the lockable groove 56e is formed in the right side of the lock pawl 63a. When the slide member 56 is moved leftward (in a direction to open the shutter 13), the hook portion 63f engages with the engagement inclined surface 56f so as to surely stop the movement of the slide member 56.

The second lock member 64 includes a link portion 64b, a rotation portion 64d, a pressure piece 64d, and a spring stoppage portion 64e. The link portion 64b provided with a hole 64a is inserted onto the outer circumference of the boss 63c of the first lock member 63 rotatably. The rotation portion 64c is provided integrally with the link portion 64b so as to rotate around the boss 63c. The pressure piece 64d is provided erectly and vertically to a side surface of the rotation portion 64c. The spring stoppage portion 64e stops one end of a lock spring 65.

The first lock member 63 is moved between a first lock position and a first unlock position. As shown in FIG. 13A, in the first lock position, the hook portion 63f of the lock pawl 63a engages with the engagement inclined surface 56f of the lockable groove 56e of the slide member 56. As shown in FIG. 13C, in the first unlock position, the hook portion 63f slides downward so as to release engagement with the lockable groove 56e.

In the first lock position shown in FIG. 13A, a right end portion of the hook portion 63f of the lock pawl 63a and a left end portion of the engagement inclined surface 56f of the lockable groove 56e are disposed on a vertical line or with a slight gap formed horizontally. In other words, in this state, the hook portion 63f does not engage with the engagement inclined surface 56f so that the first lock member 63 can move downward.

When the slide member 56 moves slightly leftward as illustrated in the drawings, the engagement inclined surface 56f surely engages with the hook portion 63f so as to stop movement of the slide member 56. Incidentally, when the slide member 56 moves leftward, the shutter 13 also moves toward the opening direction. A movement distance for engagement of the engagement inclined surface 56f with the hook portion 63f is far smaller than an overlap quantity between the cartridge body 11 and the shutter 13 in the vicinities of the inner holes 18 and 19 so that the inner holes 18 and 19 are not opened.

The second lock member 64 is moved between a second lock position and a second unlock position. As shown in FIG. 13A, in the second lock position, the second lock member 64 is urged by the lock spring 65 vertically so that the pressure piece 64d is protruded from a notch 67 in the positioning groove 7. As shown in FIG. 13B, in the second unlock position, the second lock member 64 is rotated clockwise.

A rectangular slide frame 69, a regulation piece 70 and a boss 71 are formed in the inner surface of the first shell 25. The slide portion 63b of the first lock member 63 is inserted into the slide frame 69 so as to be slidable in an up/down direction. The regulation piece 70 catches one side surface and the bottom of the rotation portion 64c of the second lock member 64 so as to prevent the rotation portion 64c from rotating clockwise and sliding downward. The other end of the lock spring 65 is stopped by the boss 71. An opening 72 is formed in the slide frame 69 so as to expose the operation hole 63d of the first lock member 63 to the outside from the outer surface of the first shell 25. Similarly, an opening 73 is formed in a position opposite to the opening 72 in the second shell 26 so as to expose the operation hole 63d to the outside.

FIG. 13A shows the state of the lock mechanism 27 of the cartridge 2 when the cartridge 2 is not in use. Since the second lock member 64 is urged upward by the lock spring 65, the lock pawl 63a of the first lock member 63 goes into the lockable groove 56e of the slide member 56. In this manner, when the shutter 13 is intended to slide from the close position to the open position, the engagement inclined surface 56f of the lockable groove 56e engages with the hook portion 63f of the lock pawl 63a so as to prevent the shutter 13 from sliding. The inclinations of the engagement inclined surface 56f and the hook portion 63f are shaped in such a manner that the engagement inclined surface 56f and the hook portion 63f are further interlocked with each other when the slide member 56 moves to open the shutter 13. Accordingly, movement of the slide member 56 is surely prevented.

Even if a rod or the like were inserted into the operation hole 63d of the first lock member 63 through either of the openings 72 and 73 provided in the first and second shells 25 and 26 in order to slide the first lock member 63, the lock cannot be released because the bottom of the second lock member 64 abuts on the regulation piece 70.

Figure 14:
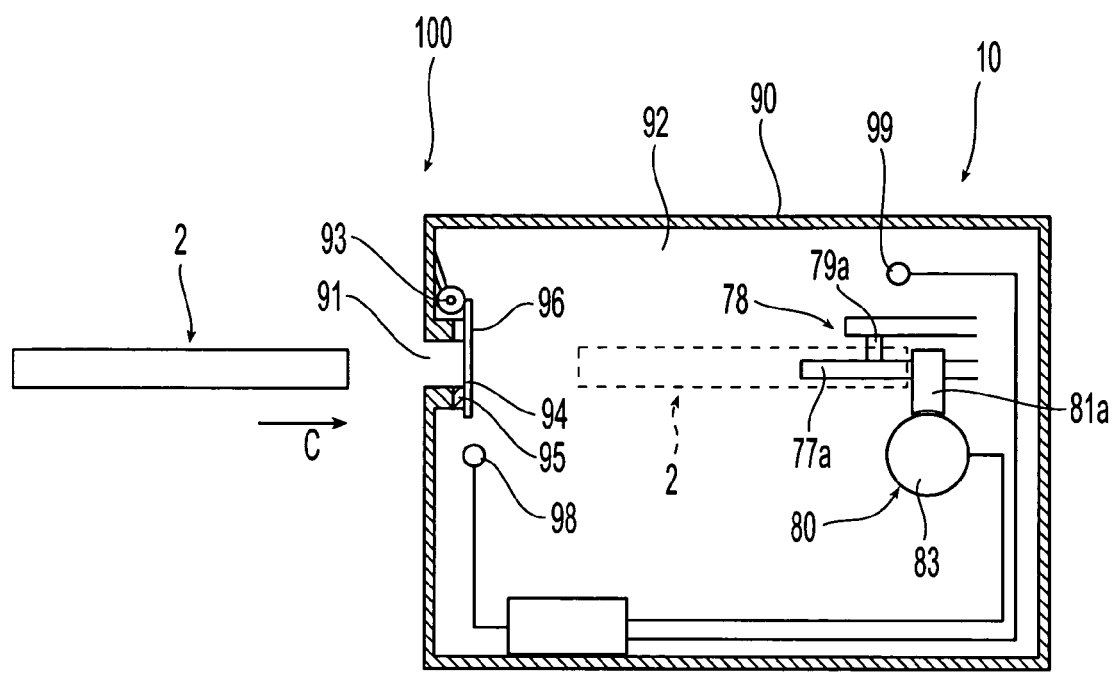
FIG. 14 is a view schematically showing the configuration of a recording/reproducing device.

Next, the recording/reproducing device 10 such as a holographic recording device will be described. As shown in FIGS. 1 and 14, the recording/reproducing device 10 to be used after mounted with the cartridge 2 is provided with a housing 90. The housing 90 has an insertion port 91 through which the cartridge 2 can be inserted, and an internal space 92 shielded against external light. The insertion port 91 is opened/closed by an insertion port shutter 94 which is provided in the inside of the housing 90 rotatably around a pin 93. The insertion port shutter 94 stops one end of a torsion coil spring 96 so as to be urged in a direction to close the insertion port shutter 94. A shielding member 95 is fixed to the insertion port 91 all over the whole circumference of the opening. When the insertion port shutter 94 is closed, the shielding member 95 cooperates with the insertion port shutter 94 to shield the insertion port 91 from external light.

An unlock mechanism 78 and a shutter opening mechanism 80 are incorporated in the housing 90. The unlock mechanism 78 includes a pair of positioning members 77a and 77b, and a pair of engagement pins 79a and 79b. The pair of positioning members 77a and 77b are second unlock members which are operated after engaging with the second lock member 64. The pair of engagement pins 79a and 79b are first unlock members which are operated after engaging with the first lock member 63.

The pair of positioning members 77a and 77b protrude toward the insertion port 91 and are fixed to the housing 90 so that the pair of positioning member 77a and 77b engage with the positioning grooves 7 and 8 on the opposite side surfaces of the cartridge 2 when the cartridge 2 is inserted in the direction of the arrow C through the insertion port 91. The pair of positioning members 77a and 77b engaging with the positioning grooves 7 and 8 position the cartridge 2 in an insertion direction of the cartridge 2 and in a direction perpendicular to the insertion direction.

The pair of engagement pins 79a and 79b are disposed so as to protrude downward from a pair of arms 79A and 79B fixed to the housing 90. One of the pair of engagement pins 79a and 79b is inserted into the operation hole 63d of the first lock member 63 through corresponding one of the openings 72 and 73 of the cartridge 2 when the cartridge 2 is inserted. Since data can be recorded on both surfaces of the recording disk 4, the cartridge 2 can be set in the recording/reproducing device 10 while either the A surface 2a and the B surface 2b of the cartridge 2 is faced upward. When the mounting surface is inverted, the lock mechanism 27 must be located on a laterally reversed side. For this reason, the engagement pin 79b is provided to be used for inverse mounting so that the engagement pin 79b can engage with the operation hole 63d even when the cartridge 2 is mounted inversely.

The pair of engagement pins 79a and 79b are disposed so that the pair of engagement pins 79a and 79b can come in and out of the arms 79A and 79B respectively. The pair of engagement pins 79a and 79b are urged downward by springs not shown. In this manner, when one of the engagement pins engages with the operation hole 63d, the other engagement pin abuts on the cartridge 2 so as not to stand in the way but withdraw into the arm 79.

The shutter opening mechanism 80 includes a pair of operation pieces 81a and 81b, and a lead screw 82. The pair of operation piece's 81a and 81b abut on the outside of the to-be-operated portion 56d of the slide member 56. A right screw 82a and a left screw 82b are formed in opposite end sides of the lead screw 82, respectively. The operation piece 81a is geared with the right screw 82a of the lead screw 82 while the operation piece 81b is geared with the left screw 82b of the lead screw 82. A rotation shaft of a drive motor 83 is fixed to one end of the lead screw 82 so that the lead screw 82 is rotated clockwise or counterclockwise.

When the lead screw 82 rotates counterclockwise, the operation pieces 81a and 81b move to approach each other so as to press the to-be-operated portion 56d to thereby slide the shutter 13 to the open position. Provision of the pair of operation pieces 81a and 81b is to handle inverse insertion of the cartridge 2.

An illuminance sensor 98 and a cartridge sensor 99 are provided in the inside of the housing 90. The illuminance sensor 98 detects brightness of the inside of the housing 90. The cartridge sensor 99 detects the front end of the cartridge 2 inserted through the insertion port 91, so as to detect that the cartridge 2 is inserted to a predetermined position normally. The illuminance sensor 98 may be a shutter opening/closing detection sensor (not shown) for detecting closing of the insertion port shutter 94.

When the cartridge 2 is mounted into the recording/reproducing device (holographic recording device) 10 through the insertion port 91, the positioning member 77a fixed to the recording/reproducing device 10 is inserted into the positioning groove 7 so as to position the cartridge 2, and at the same time, the positioning member 77a presses the pressure piece 64d of the second lock member 64 against the urging of the lock spring 65, as shown in FIG. 13B. The second lock member 64 rotates clockwise around the link portion 64b so that the bottom of the rotation portion 64c leaves the regulation piece 70. Accordingly, the first lock member 63 can slide downward.

When the cartridge 2 is further inserted in the direction of the arrow C so that the operation hole 63d of the first lock member 63 arrives at the position of the engagement pin 79a of the unlock mechanism 78 fixed in the device, the engagement pin 79a is inserted into the operation hole 63d of the first lock member 63 by action of the spring incorporated into the arm 79. Successively, due to the insertion of the cartridge 2, the first lock member 63 is moved downward as shown in FIG. 13C so as to pull the lock pawl 63a out of the lockable groove 56e to thereby release the engagement. Thus, the lock mechanism 27 of the cartridge 2 is released so that the shutter 13 can be opened/closed.

Figure 15:
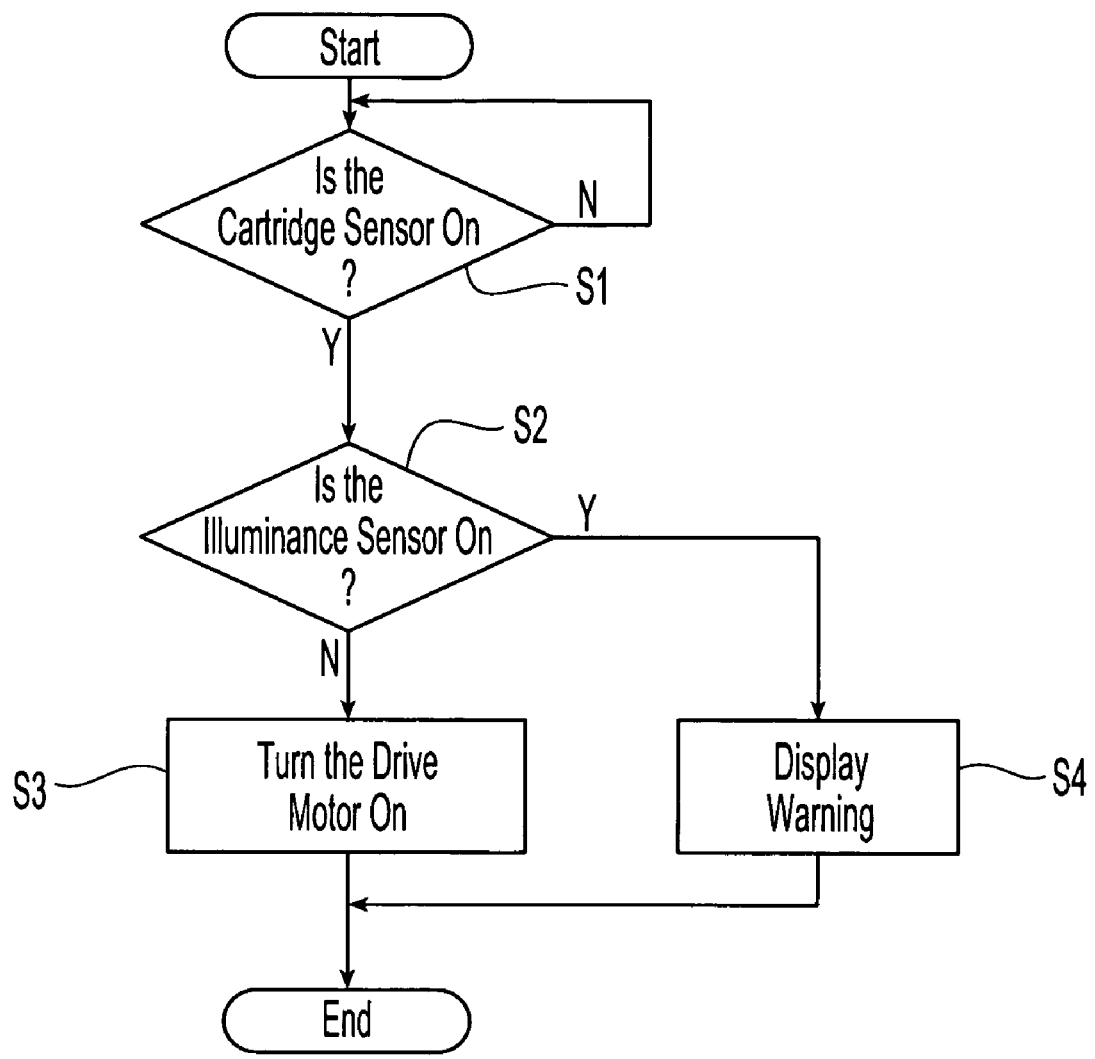
FIG. 15 is a flow chart for explaining a procedure for opening the shutter of the recording/reproducing device.

Next, description will be made with reference to FIG. 15. When the cartridge 2 unlocked as described above arrives at a predetermined position, the cartridge sensor 99 is turned on because of detection of the front end of the cartridge 2 so as to detect that the cartridge 2 has been inserted normally to the predetermined position (S1). On this occasion, the operation piece 81a of the shutter opening mechanism 80 is disposed in the outside of the to-be-operated portion 56d of the slide member 56.

When the illuminance sensor 98 then detects brightness of the inside of the housing 90 to be not higher than a predetermined value of illuminance, decision is made that the housing 90 is shielded against light (S2). The drive motor 83 is rotated so as to rotate the lead spring 82 counterclockwise (S3). Accordingly, the operation pieces 81a and 81b geared with the right screw 82a and the left screw 82b of the lead screw 82 move to approach each other so as to press the to-be-operated portion 56d to thereby move and open the shutter 13. Data are recorded on the recording disk 4. or recorded data are reproduced from the recording disk 4 by a head not shown while the recording disk 4 is rotated.

When the illuminance detected by the illuminance sensor 98 is not higher than the predetermined value (S2), there is fear that the recording disk 4 may be exposed to light so that attention of a user is drawn by warning displayed on a display device (not shown) without opening the shutter 13 or by ejection of the cartridge 2 from the recording/reproducing device 10 (S4).

In this manner, the lock based on the lock mechanism 27 is not released unless the second lock member 64 is rotated to slide the first lock member 63. Thus, the shutter 13 can be effectively prevented from being opened unintentionally. In addition, the lock based on the lock mechanism 27 is released automatically when the cartridge 2 is inserted into the recording/reproducing device 10. The shutter 13 is opened after the recording/reproducing device 10 is shielded against light. Accordingly, the recording disk 4 can be surely prevented from being exposed to light.

Although ultrasonic welding is used for fixation between the first shell and the second shell, other welding methods or fixation methods may be used. When, for example, the first shell and the second shell are fixed to each other by screws etc., it is preferable that a shielding structure is also formed in the circumference of each screw hole. Although each of the second shell and the first shell is formed by one component, each of the second shell and the first shell may be formed by assembling a plurality of components. When, for example, each of the second shell and the first shell is formed by two components with the shutter storage portion as a boundary, mold can be simplified.

Although description has been made on an example of a cartridge for receiving a recording disk on opposite surfaces of which data can be recorded, the invention can be also applicable to a recording disk on only a single surface of which data can be recorded. In this case, an opening is formed only in one surface and this opening is opened/closed by the shutter. Although description has been made on an example of a cartridge for receiving a holographic recording medium, the invention can be also applied to another cartridge for receiving another photosensitive recording medium. Although description has been made on the case where the lock mechanism is a double lock mechanism, the invention is not limited to the double lock mechanism.

This application is based on Japanese Patent application JP 2005-236663, filed Aug. 17, 2005, the entire content of which is hereby incorporated by reference, the same as if set forth at length.

What is claimed is:

1. A system for recording/reproducing a photosensitive recording medium, comprising:

a photosensitive recording medium cartridge including a cartridge body, a shutter, and a lock mechanism, the cartridge body receiving a photosensitive recording medium therein so that the photosensitive recording medium can rotate, the cartridge body having an opening for exposing a center and a recording surface of the photosensitive recording medium to the outside, the shutter being attached to the outside of the cartridge body so as to be disposed movably between a close position for closing the opening and an open position for opening the opening, the lock mechanism being provided for locking the shutter in the close position; and a recording/reproducing device including a housing, an insertion port shutter, an unlock mechanism, and a shutter opening mechanism, the housing being provided with an insertion port through which the photosensitive recording medium cartridge can be inserted into the housing, the housing having an internal space shielded from external light, the insertion port shutter being provided to open/close the insertion port desirably so that the insertion port shutter shields the insertion port from external light when the insertion port is closed, the unlock mechanism being provided for releasing the lock based on the lock mechanism when the photosensitive recording medium cartridge is inserted, the shutter opening mechanism being provided for opening the shutter of the photosensitive recording medium cartridge when the photosensitive recording medium cartridge is inserted into a predetermined position and the inside of the housing is shielded from light;

wherein the recording/reproducing device further includes an illuminance sensor for detecting illuminance in the inside of the housing, and wherein a light-shielded state of the inside of the housing is decided when illuminance not higher than a predetermined value is detected by the illuminance sensor for controlling the shutter.

2. The system according to claim 1, wherein the lock mechanism of the photosensitive recording medium cartridge has:

a first lock member provided so that the first lock member can move between a first lock position for preventing the shutter from moving to the open position and a first unlock position for permitting the shutter to move to the open position; and a second lock member provided so that the second lock member can move between a second lock position for preventing the first lock member from moving to the first unlock position and a second unlock position for permitting the first lock member to move to the first unlock position.

3. The system according to claim 1, wherein the unlock mechanism has:

a second unlock member fixed to the inside of the housing of the recording/reproducing device so that when the photosensitive recording medium cartridge is inserted through the insertion port, the second unlock member engages with the second lock member and moves the second lock member to the second unlock position; and a first unlock member fixed to the inside of the housing of the recording/reproducing device so that after the second lock member moves to the second unlock position, the first unlock member engages with the first lock member and moves the first lock member to the first unlock position, and wherein the lock based on the lock mechanism is released automatically when the photosensitive recording medium cartridge is inserted through the insertion port.

4. The system according to claim 2, wherein the unlock mechanism has:

a second unlock member fixed to the inside of the housing of the recording/reproducing device so that when the photosensitive recording medium cartridge is inserted through the insertion port, the second unlock member engages with the second lock member and moves the second lock member to the second unlock position; and a first unlock member fixed to the inside of the housing of the recording/reproducing device so that after the second lock member moves to the second unlock position, the first unlock member engages with the first lock member and moves the first lock member to the first unlock position, and wherein the lock based on the lock mechanism is released automatically when the photosensitive recording medium cartridge is inserted through the insertion port.

5. The system according to claim 1, wherein the recording/reproducing device further includes a shutter opening/closing detection sensor for detecting opening/closing of the insertion port shutter, and wherein the light-shielded state of the inside of the housing is decided when the presence of the insertion port shutter in the close position port is detected by the shutter opening/closing detection sensor.

6. The system according to claim 2, wherein the recording/reproducing device further includes a shutter opening/closing detection sensor for detecting opening/closing of the insertion port shutter, and wherein the light-shielded state of the inside of the housing is decided when the presence of the insertion port shutter in the close position port is detected by the shutter opening/closing detection sensor.

7. The system according to claim 3, wherein the recording/reproducing device further includes a shutter opening/closing detection sensor for detecting opening/closing of the insertion port shutter, and wherein the light-shielded state of the inside of the housing is decided when the presence of the insertion port shutter in the close position port is detected by the shutter opening/closing detection sensor.

8. The system according to claim 4, wherein the recording/reproducing device further includes a shutter opening/closing detection sensor for detecting opening/closing of the insertion port shutter, and wherein the light-shielded state of the inside of the housing is decided when the presence of the insertion port shutter in the close position port is detected by the shutter opening/closing detection sensor.

9. The system according to claim 1, wherein the photosensitive recording medium is a holographic recording medium.

10. The system according to claim 2, wherein the photosensitive recording medium is a holographic recording medium.

11. The system according to claim 3, wherein the photosensitive recording medium is a holographic recording medium.

12. The system according to claim 4, wherein the photosensitive recording medium is a holographic recording medium.

* * * * *